(12) United States Patent
Sudhues et al.

(10) Patent No.: US 12,356,889 B2
(45) Date of Patent: Jul. 15, 2025

(54) CUTTING UNIT HAVING A MULTI-PART HEIGHT-ADJUSTABLE REEL

(71) Applicant: Carl Geringhoff GmbH & Co. KG, Ahlen (DE)

(72) Inventors: Steffen Sudhues, Ahlen (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 401 days.

(21) Appl. No.: 17/767,931

(22) PCT Filed: Oct. 6, 2020

(86) PCT No.: PCT/EP2020/077910
§ 371 (c)(1),
(2) Date: Sep. 8, 2022

(87) PCT Pub. No.: WO2021/069397
PCT Pub. Date: Apr. 15, 2021

(65) Prior Publication Data
US 2024/0090378 A1   Mar. 21, 2024

(30) Foreign Application Priority Data

Oct. 11, 2019   (DE) ............... 10 2019 127 506.7

(51) Int. Cl.
*A01D 41/06* (2006.01)
*A01D 41/14* (2006.01)
*A01D 57/04* (2006.01)

(52) U.S. Cl.
CPC ........... *A01D 41/144* (2013.01); *A01D 57/04* (2013.01)

(58) Field of Classification Search
CPC ....... A01D 57/04; A01D 57/05; A01D 41/144
See application file for complete search history.

(56) References Cited

U.S. PATENT DOCUMENTS 2,387,069 A * 10/1945 Herrstrom ............. A01D 57/04
56/222
4,597,568 A * 7/1986 Drexhage ................ F16F 1/14
5/164.1

(Continued)

FOREIGN PATENT DOCUMENTS

DE         21 52 279       4/1973
DE    10 2015 109 191     12/2015

(Continued)

*Primary Examiner* — Joseph M Rocca
*Assistant Examiner* — Jose Antonio Martinez
(74) *Attorney, Agent, or Firm* — Gudrun E. Huckett (57) ABSTRACT

The aim of the invention is to increase the feed rate of the cutting unit while achieving lower costs. This aim is achieved, according to the invention, in that at least two reel support arms (26) supporting a reel part (24a, 24b, 24c) are interconnected, for conjoint rotation, by means of a torsion shaft (30a, 30b), the reel support arms (26a, 26b, 26c, 26d) and the torsion shaft (30a, 30b) form a reel support unit (32), the reel support unit (32) is connected to an adjustment drive (28a, 28b), which acts on one or more reel support arms (26a, 26b, 26c, 26d) and/or on the torsion shaft (30a, 30b) and, in the event of adjustment movements of the remotely controlled adjustment drive (28a, 28b), raises or lowers the associated reel part (24a, 24b, 24c), the torsion shaft (30a, 30b) has, on a first side, a bearing point (34) fixed in the axial direction of the torsion shaft (30a, 30b), and the torsion shaft is mounted, on a second side, in a plain bearing (38).

9 Claims, 4 Drawing Sheets

(56) References Cited

U.S. PATENT DOCUMENTS

| | | | | |
|---|---|---|---|---|
| 8,087,224 | B1* | 1/2012 | Coers | A01D 57/20 |
| | | | | 56/153 |
| 2018/0368317 | A1* | 12/2018 | Schulze Selting ... | A01D 41/141 |
| 2018/0368320 | A1* | 12/2018 | Schulze Selting ... | A01D 41/142 |
| 2019/0124842 | A1* | 5/2019 | Ricketts | A01D 57/03 |
| 2020/0390035 | A1* | 12/2020 | Hunt | A01D 41/144 |

FOREIGN PATENT DOCUMENTS

| | | | | |
|---|---|---|---|---|
| DE | 10 2017 113 775 | | 12/2018 | |
| JP | 2012060971 | | 3/2012 | |
| WO | WO-2020101871 | A1 * | 5/2020 | ............. A01D 41/06 |
| WO | WO-2020154644 | A1 * | 7/2020 | ........... A01D 41/144 |

* cited by examiner

CUTTING UNIT HAVING A MULTI-PART HEIGHT-ADJUSTABLE REEL

BACKGROUND OF THE INVENTION

The present invention relates to a cutting unit for attachment to a harvesting machine with a frame extending substantially across the working width of the cutting unit and assembled of a plurality of frame parts that each extend across a partial working width and that are connected to each other in an articulated fashion about an axis extending at least approximately in working direction of the cutting unit; cutting elements arranged at the front side of the cutting unit and connected to the frame; conveying surfaces and conveying members for conveying the cut crop from the cutting elements to a discharge location; at least one conveying member is a multi-part reel whose reel parts each extend transversely to the working direction of the cutting unit across at least a partial working width of the cutting unit; and the reel parts are held by reel support arms that are fastened pivotably to the frame or frame parts and are height-adjustable by adjustment drives for height adjustment of the reel parts.

When in this description "front" and "rear" are mentioned, these terms are always used in relation to the working direction of the cutting unit. The working direction is the direction in which the cutting unit is moved in order to cut the crop.

The publication DE 10 2015 109 191 A1 discloses a cutting unit that is assembled of a plurality of frame parts that each extend across a partial working width and that are connected to each other in an articulated fashion about an axis extending at least approximately in working direction of the cutting unit. In the embodiment illustrated in this publication, a central frame part is disclosed that is connected in an articulated fashion to two lateral frame parts. The cutting unit disclosed in this publication can comprise conveying surfaces that are formed by conveying belts of a draper head driven in circulation and that convey the cut crop from the respective cutting point at the cutter bar as cutting element to a central and rearwardly arranged discharge location. The conveying belts form in this manner at the same time conveying members, and the conveying surface and the upwardly facing surface of the conveying members are located in an identical plane. Instead of conveying belts, the cutting unit can also comprise a rigid sheet metal bottom as a cutting unit trough that defines the conveying surface and across which the cut crop is conveyed by a screw conveyor as a conveying member.

As a conveying member, in particular a three-part height-adjustable reel is disclosed. The three reel parts are held by four reel support arms that are connected pivotably to the frame and at which hydraulic cylinders engage as adjustment motors for adjustment of the height position of the reel support arms and thus of the reel parts in vertical direction. In order to obtain a synchronous movement upon the height adjustment of the reel support arms, the hydraulic cylinders are connected to each other in a hydraulic circuit in the manner disclosed therein. The hydraulic system as a whole is however comparatively complex. It is an object of the invention to reduce the manufacturing costs for a cutting unit of the aforementioned kind.

In the publication DE 10 2017 113 775 A1, a three-part cutting unit with a three-part reel is disclosed also. Here, it is noted that, for pivoting of an outer frame part relative to the central frame part, the screw conveyor in the outer frame part should be designed length-adjustable in axial direction in order to obtain a better conveying performance without material accumulation on the conveying surface in sections. How a reel with a plurality of reel parts might be adaptable to such pivot movements without incurring for this purpose a constructive and financial expenditure that is too high cannot be taken from this publication.

It is the object of the present invention to increase the conveying output of the cutting unit at low costs.

SUMMARY OF THE INVENTION

The object is solved for a cutting unit of the aforementioned kind in that at least two reel support arms supporting a reel part are connected rotatably fixed to each other by a torsion shaft; the reel support arms and the torsion shaft form a reel support unit; the reel support unit is connected to an adjustment drive that engages one or a plurality of reel support arms and/or the torsion shaft and, upon adjustment movements of a remote-controlled adjustment drive, lifts or lowers the associated reel part; and the torsion shaft comprises a fixed bearing point in axial direction of the torsion shaft at a first side and is supported in a plain bearing at a second side.

The torsion shaft connects at least two reel support arms rotatably fixed to each other so that the pivot movement of these two reel support arms must no longer be matched to each other. By only one single adjustment drive, for example, a hydraulic cylinder, at least two reel support arms are adjusted in their height at the same time. The reel part that is held by these two reel support arms moves with its two ends always in the same direction and by the same angle degrees upwardly and downwardly. When the torsion shafts of neighboring reel parts are connected rotatably fixed to each other, said one adjustment drive can be sufficient in order to adjust at least two reel parts in regard to height in that the rotational movement of a torsion shaft is transmitted onto the other torsion shaft and thereby the reel support arms connected rotatably fixed to this torsion shaft can be adjusted also in the same direction and by the same amount in their height. The constructive expenditure for ensuring synchronous movement of the reel support arms supporting one or a plurality of reel parts can therefore be dispensed with or can be at least significantly reduced.

The support of a torsion shaft in axial direction is a problem because the torsion shaft is arranged at a height at which it comprises a distance in vertical direction relative to the axis about which the neighboring frame parts of the cutting unit pivot relative to each other. Due to the vertical distance of the torsion shaft to the axis and the circular arc about which the frame part pivots relative to the neighboring frame part, relative length differences between the ends of the frame part and the end of the torsion shaft result for different pivot positions when the torsion shaft is to follow the movements of the frame part and is provided in axial direction of the torsion shaft at both sides with a fixed bearing point. In that the torsion shaft comprises a fixed bearing point in axial direction of the torsion shaft at a first side and is supported in a plain bearing at the second side, the torsion shaft can move in axial direction in relation to the frame part with which the reel part is at least partially correlated. A plain bearing means a bearing that permits a translatory movement between the torsion shaft and the frame part on which the plain bearing is mounted. The plain bearing can be comprised of glide surfaces which are matched at least in sections to the circumferential shape of the torsion shaft. For example, plastic shells can be used as plain bearing. However, also roller bearings or ball bearings can be used that permit the relative movement between the torsion shaft and the frame part. In this way, the reel part is thus held without tension independent of the pivot position of the frame part to a neighboring frame part and can thus adapt better to pivot movements of the correlated frame part. The fixed bearing point at a first side in axial direction of the torsion shaft can be a fixed bearing, a ball bearing or universal joint, a gear unit or the like. A ball bearing or universal joint can connect the torsion shaft to a neighboring torsion shaft of a neighboring reel part.

According to an embodiment of the invention, one or a plurality of inwardly positioned reel support arms support a plurality of reel parts. For example, in case of two reel parts of a reel, the central reel support arm supports the inwardly pointing shaft stubs of the reel shafts of the two reel parts; in case of three reel parts, the two inner reel support arms support respectively the inwardly pointing shaft stub of the outwardly positioned shaft parts as well as one of the two shaft stubs of the central reel part. In this way, the number of installed reel support arms can be reduced. In that only the central one, one of the two central reel support arms or both central reel support arms are height-adjustably embodied with an adjustment drive, two or three reel parts can be adjusted with only one or two adjustment drives in respect to their height position. The number of employed hydraulic valves and of the pressure conduits to be laid in the cutting unit as well as their length are significantly reduced.

According to an embodiment of the invention, an adjustment drive engages an inwardly positioned reel support arm. Due to the more inwardly positioned arrangement of the adjustment drive, the frame is relieved. An adjustment drive which is arranged at the outer side of a cutting unit would load the attachment frame of the cutting unit with its weight with a leverage force acting across half the working width of the cutting unit, which could be additionally reinforced by dynamic vibration movements of the cutting unit. A further advantage can be seen in that the outer ends of the cutting unit have more free installation space for drives and bearings of other components of the cutting unit such as, for example, screw conveyors, belt conveyors, cutting elements, and the like. The adjustment drive can be arranged at the rear side of the cutting unit, and it can engage a bracket that projects past the circumference of the torsion shaft and is connected to the torsion shaft and/or the reel support arm.

According to an embodiment of the invention, one or a plurality of reel support arms are embodied as an element that is elastically resilient along the working width. Usually, reel support arms are comprised of rigid and substantially inelastic tubes or profiled sections. In that the reel support arms are produced as an elastically resilient element, they can easily compensate an axial offset along the working width of the cutting unit between the reel shaft of a reel part and the torsion shaft, at which the reel support arms are fastened rotatably fixed, by an elastically resilient movement without a permanent deformation in the offset direction. The elastically resilient element is designed in this context with respect to its component dimensions—the material selection, material thickness, and stay height—in such a way that it is capable of absorbing with its elasticity the possible offset travel of a reel part in relation to the corresponding frame part without a permanent deformation. In this context, the elastically resilient element generates restoring forces by means of which the elastically resilient element returns again into the normal position when the axial offset between the torsion shaft and the reel shaft is canceled. The elastically resilient element is installed in the cutting unit in such a way that the planar surface of the elastically resilient element faces the reel parts and the corresponding thin material layer of the elastically resilient element enables a lateral spring movement. The stay of the elastically resilient element is arranged in an at least approximately vertical orientation so that the elastically resilient element supports the weight of the reel parts carried by it in the vertical direction without carrying out greater elastic spring movements. The elastically resilient element can be produced, for example, of a metallic material, for example, a spring steel, or a plastic material that may also be fiber-reinforced that exhibits a spring behavior corresponding to the requirements. It may be sufficient in case of a reel with three reel parts to embody only the two outer reel support arms as elastically resilient elements because the different adjustable height differences between the reel shaft and the torsion tube in connection with the angled positioning or drop of the lateral frames leads to a relative movement only here.

According to an embodiment of the invention, the torsion shaft serves as a holder for fastening the rear wall of the cutting unit. Since the torsion shaft at the rear side of the cutting unit extends at a vertical distance to the conveying surface across a partial working width of the cutting unit, it is possible to utilize the torsion shaft in order to attach to it the rear wall of the cutting unit. The rear wall can be designed as a simple sheet metal plate that limits the conveying path of the crop from the cutting elements to the discharge location laterally to the rear and secures it against crop loss. In upward direction, the upper end of the rear wall of the cutting unit can be supported at the torsion shaft. In this way, additional components can be eliminated and the weight of the cutting unit can be lowered.

According to an embodiment of the invention, the reel comprises three reel parts of which the two outer reel parts are supported by a respective reel support unit, at least one of the two reel support units is adjustable by an adjustment drive in its height, and the two reel support units are synchronized with each other in their adjustment movements by an intermediate shaft that is connected rotatably fixed to them. The intermediate shaft is a mechanically simple but highly loadable and inexpensive possibility to synchronize the movements with each other. The reel with all three reel parts moves then always in the same direction with the same lifting strokes. The rotatably fixed connection of the outer torsion shafts with the intermediate shaft can be realized, for example, by Cardan joints so that the lateral frame parts in relation to the central frame part can pivot up and down in order to adapt to an uneven ground contour. The torsion shafts can thus follow the pivot movements of the frame parts. The Cardan joint forms than the pivot axis of the torsion shafts to the intermediate shaft.

According to an embodiment of the invention, the adjustment drive is configured as a hydraulic drive whose hydraulic circuit can be locked by hydraulic valves. The locking action of the hydraulic drive by means of the blockage of the hydraulic circuit can be utilized as a protective measure against risks due to falling objects in case of maintenance work. Up to now, for safety of maintenance work, it is required to move the reel with the reel support arms into the uppermost position in order to then insert mechanical locking devices at each individual reel support arm so that the reel is secured against accidental dropping. When the maintenance work is completed, all mechanical locking devices must be removed again. This is associated with a significant time expenditure because the driver must walk several times around the entire cutting unit and insert at various positions lock bolts and subsequently remove them again. Such maintenance work can be required several times a day, for example, in order to exchange broken knife blades or remove clogging in the cutting unit. The significant time expenditure and the associated loss of machine efficiency entail the risk that the users of the machine in case of maintenance work do not use the mechanical securing action because it appears too time-consuming to them. The hydraulic locking action now provides blocking the hydraulic conduits from and/or to the adjustment drive in the form of a hydraulic cylinder by means of a hydraulic valve. When the hydraulic conduits and hydraulic cylinders are seal-tight, a hydraulic adjustment drive can no longer move when the flow of hydraulic liquid has been blocked in the hydraulic valve. The hydraulic valves can be electrically controlled valves that upon interruption of the current supply by a mechanical spring return action mandatorily move into a closed position. The hydraulic valves can be interrupted by the actuation of a safety switch from the current supply so that for securing against risks of suspended loads it is sufficient when the driver of the harvesting machine at the beginning of maintenance work pushes the safety switch with which the electrical supply is interrupted in order to secure the reel against dangers of suspended loads. This means significant time savings for the driver. The locking action can be released again by him in that he reinstates again the current supply of the hydraulic valves by means of the safety switch. It is no longer required to walk up to each individual reel support arm and attach thereat mechanical securing means and remove them again. The actuation of a single safety switch is sufficient which can be done when walking alongside the machine when the safety switch is conveniently positioned. The quick and uncomplicated switching on and switching off of the safety means makes it more probable that the safety means is indeed actuated in case of need.

According to an embodiment of the invention, the adjustment drive is embodied as a hydraulic drive in which a lifting limitation of one or a plurality of hydraulic cylinders can be activated by an electrical control by hydraulic valves providing the lifting limitation. The lifting limitation for the reel is expedient in order to ensure that the reel tines which are mounted on the reel in case of a deep lowering of the reel do not reach into the region of action of the knife blades of the cutter bar. Depending on how flexible the cutter bar is held at the cutting unit, various distance measures may be expedient. For example, in case of a rigidly supported cutter bar, a distance of the reel tine tips of 50 mm to the cutter bar may be considered appropriate in order to eliminate the risk that the reel tine tips can reach into the cutter bar and are cut off or knife blades break. However, when the cutter bar is held at height-movable swinging arms so that the cutter bar can adapt better to a ground contour, a minimum distance of, for example, 200 mm can be expedient. Depending on which mode the cutter bar is operated in, the hydraulic valves can be electrically switched and controlled as a function of the selected operating mode such that the lifting limitation matching the actual operating mode is switched on. The lifting limitation can be activated automatically by means of software belonging to the machine or on the part of the harvesting machine or by input of the operator.

According to an embodiment of the invention, the adjustment drive comprises electrically or pneumatically operated actuators. Above and in the following subject matter description, it is disclosed that the adjustment drive can comprise hydraulic actuators such as, for example, hydraulic cylinders which are conventional nowadays in agricultural technology as motor drives. However, it is also possible to employ electric or pneumatic drives in place of hydraulic drives.

Further features of the invention result from the claims, the Figures, and the Figure description. All features and feature combinations mentioned above in the description as well as the features and feature combinations disclosed in the following in the Figure description and/or illustrated in the Figures alone are not only usable in the respectively disclosed combination but also in other combinations, or however individually.

BRIEF DESCRIPTION OF THE DRAWINGS

The invention will now be described with the aid of a preferred embodiment as well as with reference to the attached drawings in more detail.

It is shown in.

DESCRIPTION OF PREFERRED EMBODIMENTS

Figure 1:
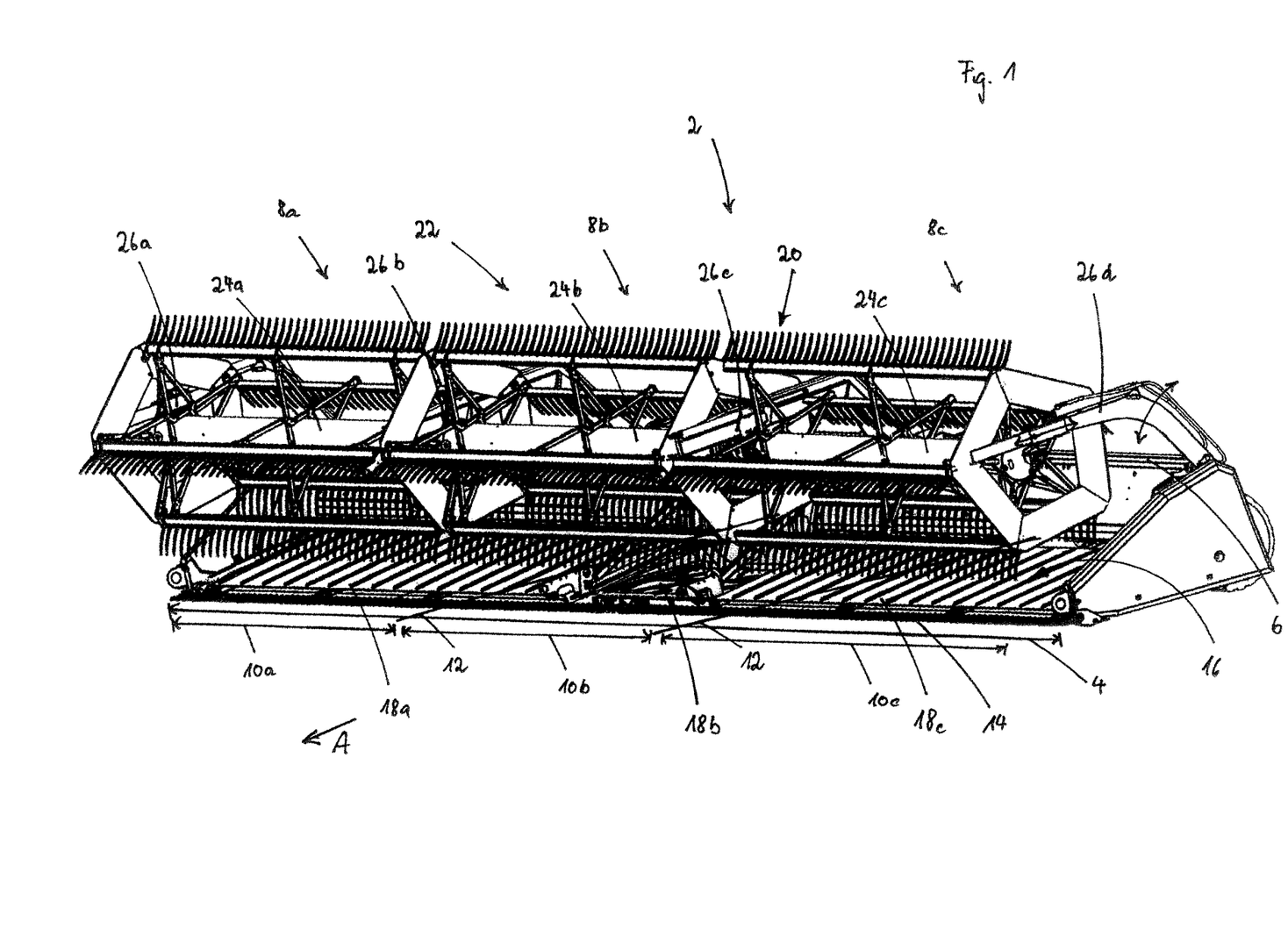
FIG. 1: a front view at a slant of a cutting unit.

In FIG. 1, a front view at a slant of a cutting unit 2 is illustrated. The cutting unit 2 comprises a working width 4. The cutting unit 2 is comprised of a frame 6 that is formed of three frame parts 8a, 8b, 8c. Each frame part 8a, 8b, 8c covers a corresponding partial working width 10a, 10b, 10c. The two outer frame parts 8a, 8c are pivotable in relation to the central frame part 8b about the axes 12 which extend in working direction A of the cutting unit 2.

At the front side of the cutting unit 2, a cutter bar as a cutting element 14 is attached. The cutter bar is driven in oscillation and comprises a plurality of knife blades that cut the crop standing on the field. As the harvesting machine is forwardly traveling into the standing crop, the cut crop drops onto the conveying surfaces 16 in the cutting unit 2. With conveying members 18—in the embodiment the two outer belt conveyors 18a, 18c that convey the cut crop transversely to the working direction to the center of the cutting unit 2 and the belt conveyor 18b conveying in the central region of the cutting unit 2 the collected crop to the rear—the crop is conveyed from the cutting elements 14 to the discharge location 20. At the discharge location 20, the cut crop is transferred to the harvesting machine.

In order for the stalks of the crop to enter the cutting element 14 properly when being cut, to not fall to the side, and to be placed properly onto the conveying surface after the cut, a rotatingly driven reel 22 is provided above the cutting elements 14. In the embodiment, the reel 22 is divided into three reel parts 24a, 24b, 24c. In the region of the dividing locations between the reel parts 24a, 24b, 24c, the reel support arms 26b, 26c are provided. The reel 22 contacts upon its rotation the grain stalks and throws them opposite to the travel direction A onto the conveying surface 16.

The reel parts 24a, 24b, 24c are held at the reel support arms 26a, 26b, 26c, 26d. The centrally arranged reel part 24b is held in this context by the reel support arms 26b, 26c that also hold the inwardly pointing shaft stubs of the reel shafts of the outer reel parts 24a, 24c. The reel support arms 26b, 26c support thus respectively the shaft stubs of two reel parts while the outer reel support arms 26a, 26d only support the outwardly pointing shaft stubs of the outer reel parts 24a, 24c. The reel support arms 26 are adjustable in the direction of the double arrow in vertical direction, resulting in a different height position of the reel 22. The reel parts 24a, 24b, 24c are adjustable additionally in horizontal direction which is also indicated by a corresponding double arrow.

Figure 2:
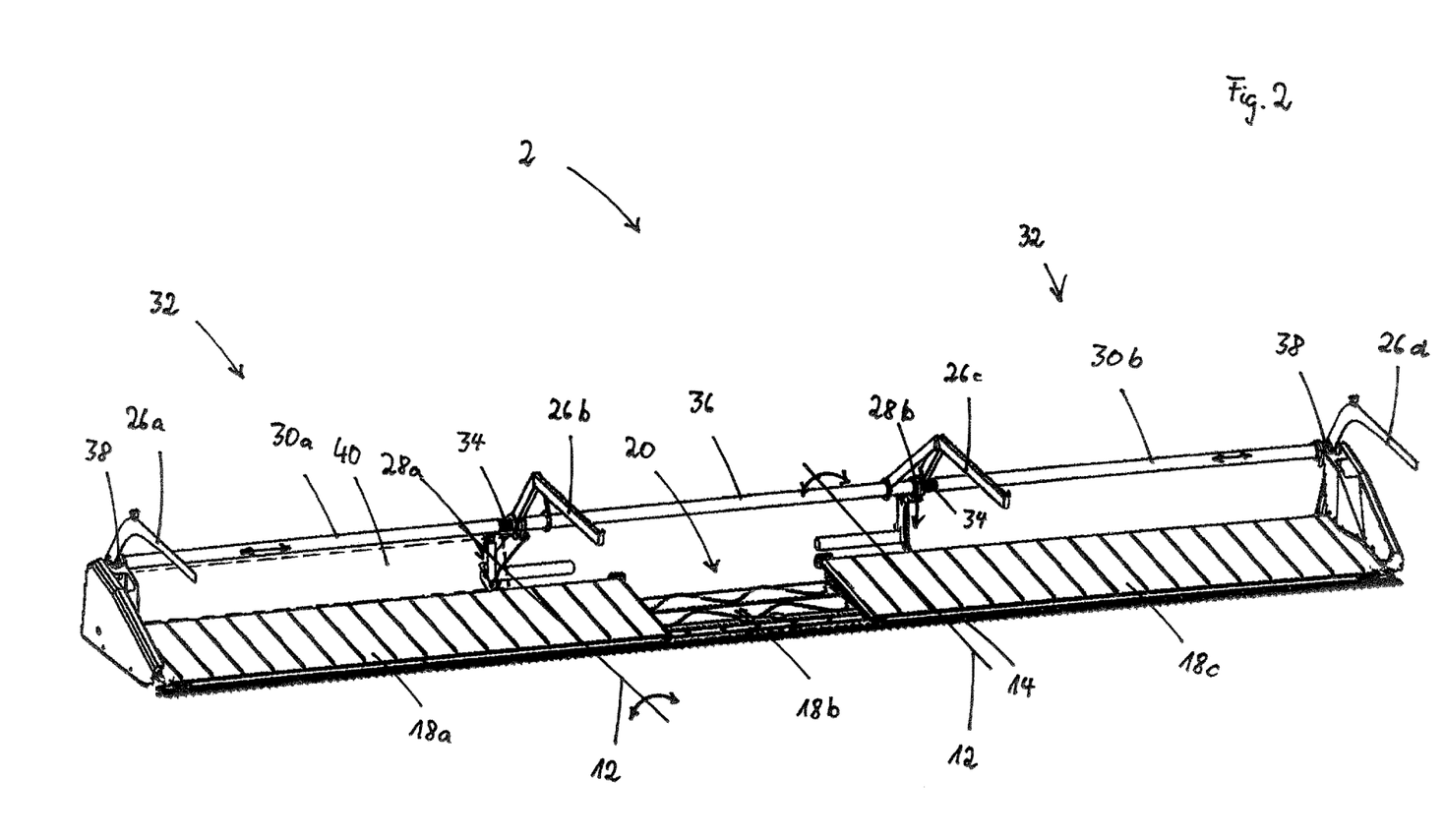
FIG. 2: a front view at a slant of a support unit without reel parts.

In FIG. 2, a front view at a slant of the cutting unit 2 is illustrated without the frame 6, the reel parts 24a, 24b, 24c, and other components. In this reduced illustration, it can be seen easily that the reel support arms 26a, 26b are adjustable by the adjustment drive 28a and the reel support arms 26c, 26d by the adjustment drive 28b. The reel support arms 26a, 26b are connected to each other by the torsion shaft 30a while the reel support arms 26c, 26d are connected to each other by the torsion shaft 30b. An adjustment movement that is exerted by an adjustment drive 28a, 28b on a reel support arm 26b, 26c is transmitted by the torsion shafts 30a, 30b also onto the reel support arms 26a, 26d. The reel support arms 26a, 26b with the torsion shaft 30a as well as the reel support arms 26c, 26d with the torsion shaft 30b each form a reel support unit in order to hold the reel parts 24a and 24c. The reel support arms 26b, 26c can hold additionally the central reel part 24b. The central reel part 24b is pivoted then together with the reel parts 24a, 24c, depending on how the reel support arms 24b, 24c are moving.

Since the frame parts 8a, 8d are pivotable about the central frame part 8b about the axes 12 and since the torsion shafts 30a, 30b are arranged spaced apart from the axes 12 in vertical direction, length differences at the outer ends of the torsion shafts 30a, 30b, which are indicated by the respective double arrows, result in relation to the outer ends of the corresponding frame parts 8a, 8c for corresponding pivot movements. The torsion shafts 30a, 30b are held and supported at fixed bearing points 34. In the embodiment, the fixed bearing points 34 are embodied as universal joints by means of which the torsion shafts 30a, 30b are connected rotatably fixed to an intermediate shaft 36. In order to compensate relative movements between the frame parts 8a, 8c and the torsion shafts 30a, 30b in the axial direction of the torsion shafts 30a, 30b, the torsion shafts 30a, 30b are connected at their outer ends by plain bearings 38 to the frame parts 8a, 8c. The torsion shafts 30a, 30b can thus glide in their axial direction in the plain bearings 38.

FIG. 2 shows that a rear wall 40, indicated in dashed lines, can be fastened also at the torsion shaft 30a.

Figure 3:
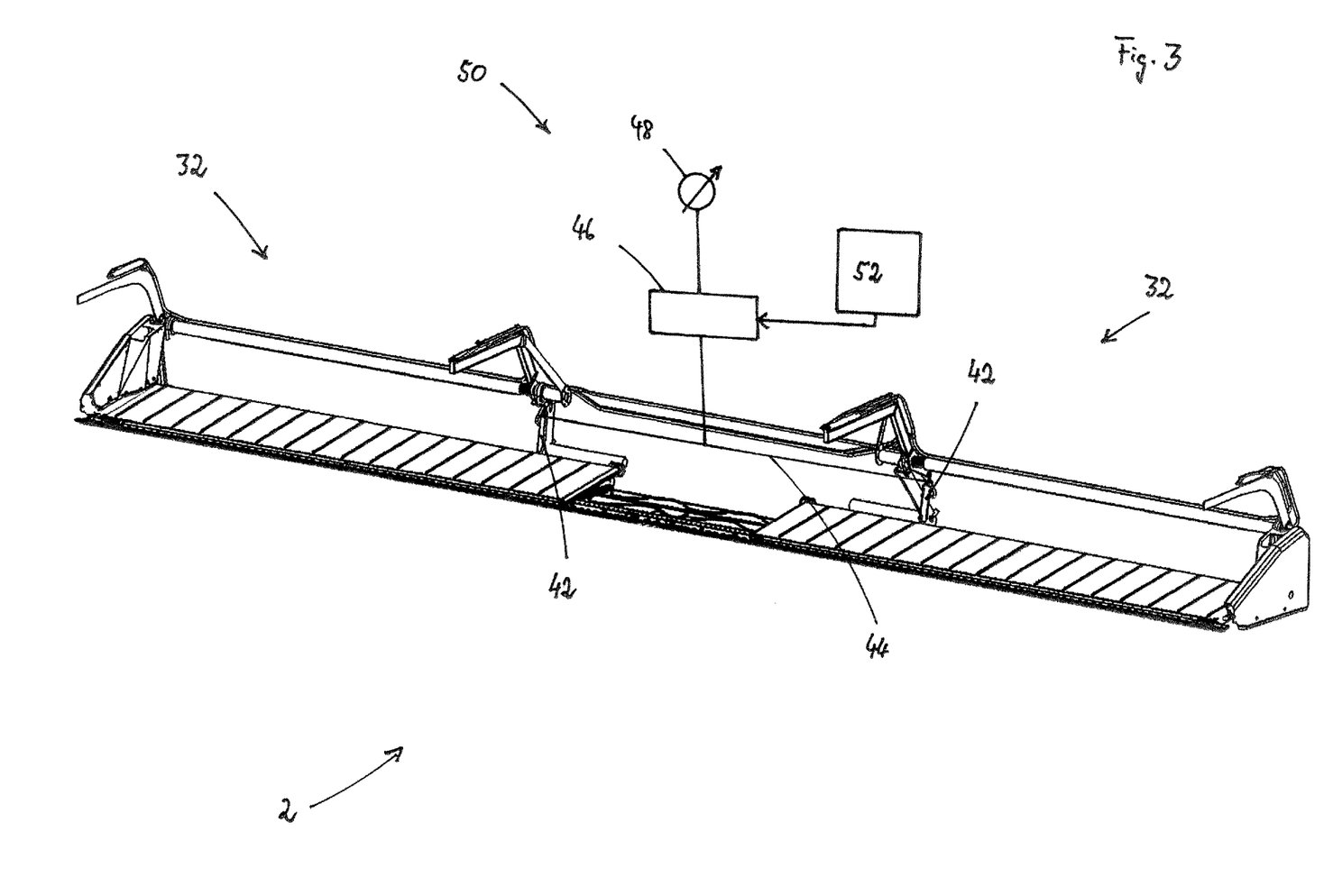
FIG. 3: the support unit illustrated in FIG. 2 without intermediate shaft in a different perspective.

In FIG. 3, the cutting unit 2 illustrated simplified in FIG. 2 is shown with support units 32 which are connected by an intermediate shaft 36. In the view illustrated in FIG. 3, the hydraulic cylinders 42 can however be seen which form the respective adjustment drives 28a, 28b in the embodiment. The hydraulic cylinders 42 form together with the hydraulic conduits 44, the hydraulic valve 46, and the hydraulic pump 48 a hydraulic drive 50. In FIG. 3, the hydraulic conduits 44 are illustrated only as a line for reasons of simplification of the illustration. It is understood however that the hydraulic conduits 44 are embodied in a hydraulic circuit with corresponding feed and return conduits and correspondingly designed hydraulic valves 46.

By means of a hydraulic valve 46, the hydraulic circuit can be blocked, for example, completely in relation to the hydraulic cylinders 42. This is possible by means of the use of a 2/2 way valve. In the closed position of the 2/2 way valve, it blocks any flow of hydraulic liquid so that the hydraulic cylinders 42 in the actual extended position are blocked. The hydraulic circuit functions in this way as a static securing action of the suspended load of the reel 22 below which then maintenance work can be carried out such as, for example, the exchange of knife blades at the cutting element 14 or the removal of material accumulations on the conveying surfaces 16 or at the conveying members 18.

The 2/2 way valve can be controlled electrically, for example, by an operating electronics 52, for example. The operating electronics 52 can be embodied as a switch with which a simple on/off switching action is possible or it is a complex operating electronics 52 in which software-supported operating inputs by means of keys or touch pads at an operating field are possible.

Figure 4:
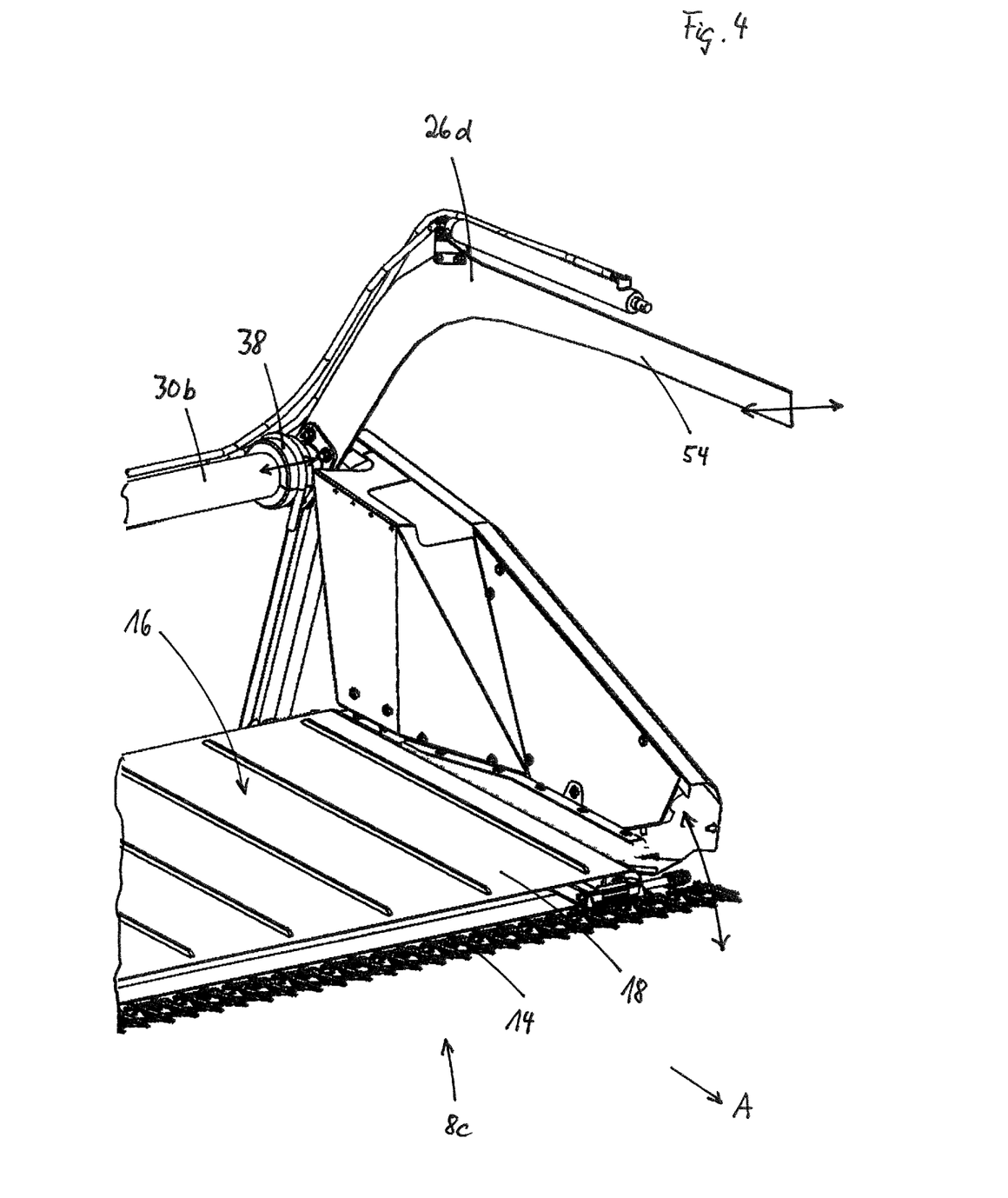
FIG. 4: a detail view of a side wall of the cutting unit.

In FIG. 4, a detail view of the outer end of the frame part 8c is illustrated. The reel support arm 26d is embodied as a flat sheet steel that forms an elastically resilient element 54 which at its outer tip can move elastically resiliently in the direction of the double arrow illustrated thereat transversely to the working direction A. Due to the elastically resilient element 54, it is possible that the reel part 24c as well as the torsion shaft 30d can change their position relative to the frame part 8c. The pivot movement of the frame part 8c is indicated also by a double arrow in FIG. 4.

The invention is not limited to the afore described embodiments. A person of skill in the art will have no difficulties to modify the embodiments in a manner appearing suitable to him in order to adapt them to a concrete application situation.

LIST OF REFERENCE NUMBERS 2 cutting unit
4 working width
6 frame
8 frame part
10 partial working width
12 axis
14 cutting element
16 conveying surface
18 conveying member
20 discharge location
22 reel
24 reel part
26 reel support arm
28 adjustment drive
30 torsion shaft
32 reel support unit
34 bearing point
36 intermediate shaft
38 plain bearing
40 rear wall
42 hydraulic cylinder
44 hydraulic conduit
46 hydraulic valve
48 pump
50 hydraulic drive
52 operating electronics
54 elastically resilient element

What is claimed is:

1. A cutting unit (2) configured to attach to a harvesting machine, wherein the cutting unit (2) comprises:
   a frame (6) extending substantially across a working width (4) of the cutting unit (2) and assembled of a plurality of frame parts (8a, 8b, 8c) that each extend across a partial working width (10a, 10b, 10c) and are connected to each other in an articulated fashion about an axis (12) extending approximately in a working direction (A) of the cutting unit (2);

cutting elements (14) arranged at a front side of the cutting unit (2) and connected to the frame (6);

conveying surfaces (16) and conveying members (18) configured to convey a cut crop from the cutting elements (14) to a discharge location (20);

at least one of the conveying members (18) is a multi-part reel (22) comprising reel parts (24a, 24b, 24c) each extending transversely to the working direction (A) of the cutting unit (2) across at least a partial working width (10a, 10b, 10c) of the cutting unit (2);

wherein the reel parts (24a, 24b, 24c) are held by reel support arms (26a, 26b, 26c, 26d) that are fastened pivotably to the frame (6) and are height-adjustable for height adjustment of the reel parts (24a, 24b, 24c), wherein two of the reel support arms (26), which are supporting an associated reel part (24a, 24b, 24c), are connected rotatably fixed to each other by a torsion shaft (30a, 30b);

wherein the two reel support arms (26a, 26b, 26c, 26d) and the torsion shaft (30a, 30b) form a reel support unit (32);

wherein the reel support unit (32) is connected to a remote-controlled adjustment drive (28a, 28b) that engages one or a plurality of the reel support arms (26a, 26b, 26c, 26d) and/or the torsion shaft (30a, 30b) and, upon adjustment movements of the remote-controlled adjustment drive (28a, 28b), lifts or lowers the associated reel part (24a, 24b, 24c);

wherein the torsion shaft (30a, 30b) comprises a fixed bearing point (34), that is a universal joint, fixed in an axial direction of the torsion shaft (30a, 30b) at a first side of the torsion shaft (30a, 30b), and wherein the torsion shaft (30a, 30b) is supported in a plain bearing (38) at a second side of the torsion shaft (30a, 30b), wherein the plain bearing (38) enables a translatory movement of the torsion shaft (30a, 30b) in the axial direction in relation to the frame part with which the associated reel part is at least partially correlated.

2. The cutting unit (2) according to claim 1, wherein one or a plurality of the reel support arms (26a, 26b, 26c, 26d) that are inwardly positioned support a plurality of the reel parts (24a, 24b, 24c).

3. The cutting unit (2) according to claim 1, wherein the remote-controlled adjustment drive (28a, 28b) engages one of the reel support arms (26a, 26b, 26c, 26d) that is inwardly positioned.

4. The cutting unit (2) according to claim 1, wherein one or a plurality of the reel support arms (26a, 26b, 26c, 26d) are an element (54) that is elastically resilient along the working width (4).

5. The cutting unit (2) according to claim 1, wherein the torsion shaft (30a, 30b) is a holder for attachment of a rear wall (40) of the cutting unit (2).

6. The cutting unit (2) according to claim 1, wherein the multi-part reel comprises three of the reel parts (24a, 24b, 24c) including two outer reel parts (24a, 24c) each supported by a respective reel support unit (32), wherein at least one of the two reel support units (32) is height-adjustable with the remote-controlled adjustment drive (28a, 28b), and adjustment movements of the two reel support units (32) are synchronized with each other by an intermediate shaft (36) connected rotatably fixed to the two reel support units (32).

7. The cutting unit (2) according to claim 1, wherein the remote-controlled adjustment drive (28a, 28b) is a hydraulic drive (50) comprising a hydraulic circuit configured to be blocked by hydraulic valves (46).

8. The cutting unit (2) according to claim 1, wherein the remote-controlled adjustment drive (28a, 28b) is a hydraulic drive (50) comprising hydraulic valves (46) providing a lifting limitation of one or a plurality of hydraulic cylinders (42) of the hydraulic drive (50), wherein the hydraulic valves (46) are configured to be activated by an electric control for providing the lifting limitation.

9. The cutting unit (2) according to claim 1, wherein the remote-controlled adjustment drive (28a, 28b) comprises actuators that are electrically or pneumatically operated.

* * * * *